United States Patent [19]

Eubank

[11] 4,187,831
[45] Feb. 12, 1980

[54] SELF CONTAINED SOLAR HEATING SUPPLEMENTAL UNIT

[76] Inventor: Marcus P. Eubank, P.O. Box 7576, Longview, Tex. 75601

[21] Appl. No.: 917,567

[22] Filed: Jun. 21, 1978

[51] Int. Cl.² ............................................. F24J 3/02
[52] U.S. Cl. .................................... 126/419; 126/400; 165/104 S; 165/164; 165/DIG. 4; 126/429; 126/435
[58] Field of Search ........................ 126/270, 271, 400; 237/1 A; 165/140, 141, 104 S, 164, DIG. 4, 67

[56] References Cited
U.S. PATENT DOCUMENTS

| | | | |
|---|---|---|---|
| 3,853,114 | 12/1974 | Gaydos | 126/271 |
| 3,934,573 | 1/1976 | Dandini | 126/270 |
| 4,002,158 | 1/1977 | Radebold | 126/270 |
| 4,108,374 | 8/1978 | Lyon | 165/104 S |
| 4,114,600 | 9/1978 | Newton | 165/104 S |

Primary Examiner—James C. Yeung
Attorney, Agent, or Firm—Wofford, Fails & Zobal

[57] ABSTRACT

This specification discloses a self contained solar heating supplemental unit characterized by solar collector; a mast carrying a solar collector above the earth's surface; a dual function base carrying the mast and the solar collector and serving as a thermal storage unit; first heating coil disposed in the base; first interconnecting conduits interconnecting the solar collector with the first heating coil; a pump for circulating a heat conducting fluid through the solar collector and the base for transferring heat from the solar collector to the base; insulation surrounding the base to minimize heat leakage therefrom; and at least one second heat withdrawal coil disposed in the base and having connectors for connection with the second withdrawal circuit for withdrawing heat from the base for utilization. Also disclosed are specific and preferred embodiments in which respective second heat withdrawal coils are connected respectively with air circulating means and with liquid circulating means, the liquid being passed in heat exchange relationship with air or the like, as well as specific structural embodiments.

10 Claims, 8 Drawing Figures

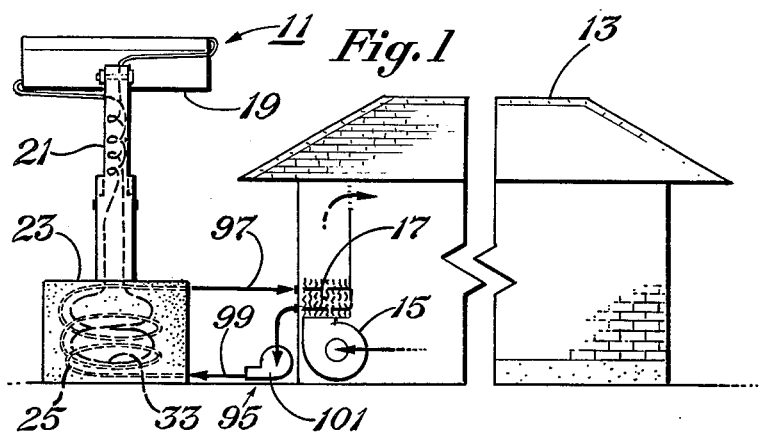
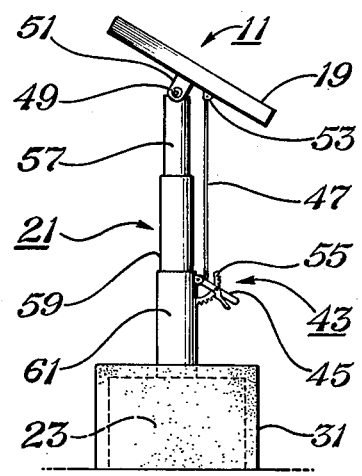
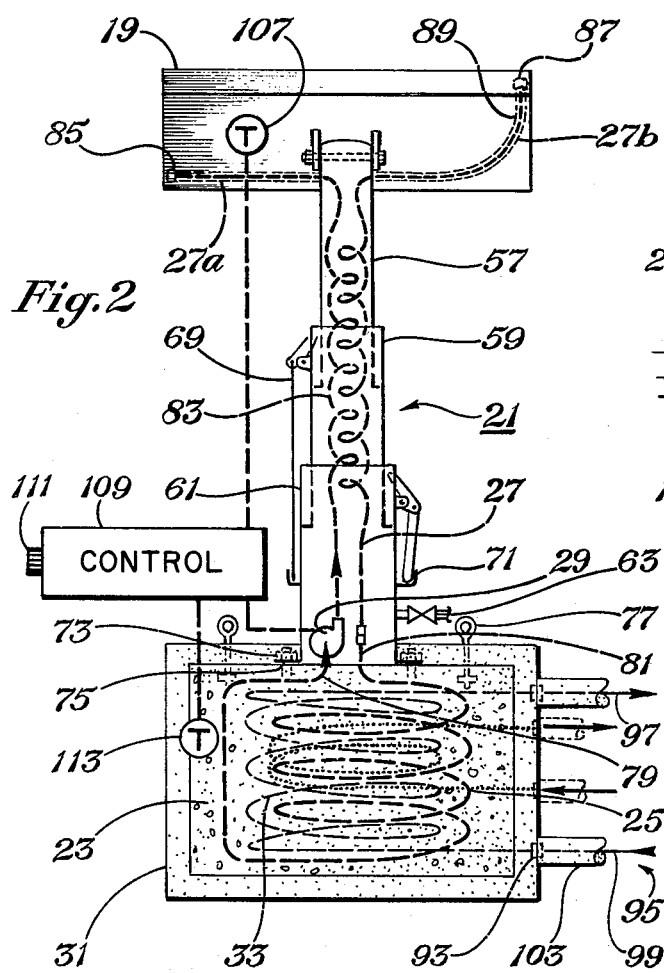
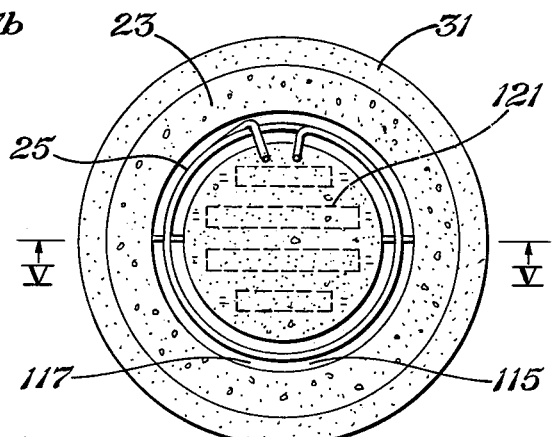
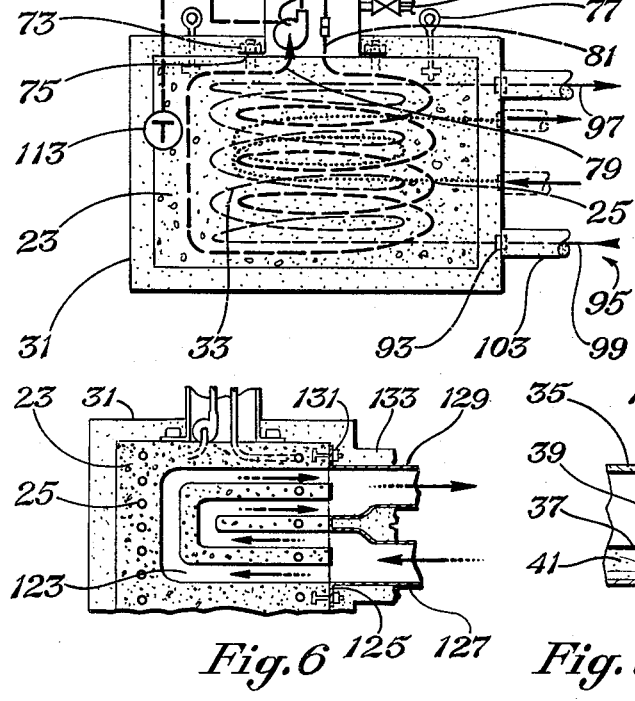
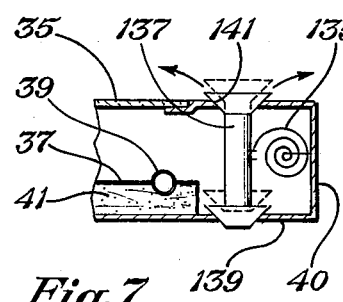
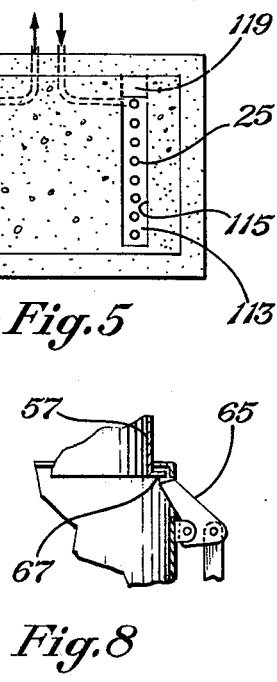

SELF CONTAINED SOLAR HEATING SUPPLEMENTAL UNIT

BACKGROUND OF THE INVENTION

1. Field of the Invention

This invention relates to supplemental units for improving energy utilization. More specifically, this invention relates to a solar energy supplemental unit that is self contained and useful in supplementing the conventional sources of energy for small buildings and the like.

2. Background of the Invention

The prior art has seen the development of the wide variety of supplemental units for augmenting conventional sources of energy. Recently, the use of solar energy has come to the forefront of this technology. The following list of U.S. Pat. Nos. are illustrative of this technology.

U.S. 2,584,573 shows a basement structure for storing heat from a heat pump in moderate weather for use in cold weather.

U.S. 3,369,541 shows a solar energy collector with heat stored in water in a tank in a heat storage bin having stones. Air is circulated about the tank and stones.

U.S. 3,815,574 shows a box containing sand or iron oxide that is employed to accumulate energy from the sun. Water is flowed therethrough to pick up the heat.

U.S. 3,985,119 shows a parabolic reflector with a primary heating coil and a green house type enclosure with preheat coils in the back.

U.S. 3,993,041 describes heating air and circulating it through a vault with sand and the like to amplify the heating of the air and thence to a steam generator.

This area has become a crowded art. It is likely to become more so. While these innovations in the prior art have been useful, even in the crowded art they have not been totally satisfactory in providing a supplemental unit that can be transported to a local situs and employed without significantly altering the architure of the small building such as the home or the like and without taking up significant interior space within the small building.

SUMMARY OF THE INVENTION

Accordingly it is an object of this invention to provide a self contained solar heating supplemental unit that can be transported to a local situs and employed in conjunction with a conventional source of energy to provide additional heating for a building or the like without requiring significant architectural modifications therefore and without requiring significant interior space; thereby obviating the deficiencies of the prior art.

It is a specific object of this invention to provide a self contained solar heating supplemental unit that has storage capacity in itself without requiring significant interior space within the building for which it will be used and accomplishing the foregoing object as well.

These and other objects will become apparent from the descriptive matter hereinafter, particularly when taken in conjunction with the appended drawings.

In accordance with this invention there is provided a self contained solar heating supplemental unit comprising:

a. at least one solar collector having at least one conduit through which a first heat conducting fluid can be circulated to carry away heat energy;

b. a mast carrying the solar collector above the surface of the earth;

c. a dual function base carrying the mast and the solar collector; the base having sufficient mass to serve as an anchor to keep the mast and collector upright and having sufficient mass sensible heat capacity to serve as a thermal storage unit for storing heat energy; the base having lifting means for being lifted and transported to a situs for use; the base being small enough to be moved to the situs;

d. a first heating coil containing a first heating fluid and disposed in the base for circulating the first heat conducting fluid through the base for storing heat from the collector in the base;

e. first interconnecting conduits sealingly interconnecting the collector conduit with the first heating coil;

f. first circulating means interposed in series fluid connection with the first interconnecting conduits, solar collector conduit, and first heating coil for periodically circulating the first heating fluid for transferring heat from the solar collector to the base;

g. insulation surrounding the base to minimize heat leakage therefrom; and h. at least one second heat withdrawal coil disposed in the base and having connection means for connection with a second heat withdrawal circuit means for withdrawing heat from the base.

In the preferred embodiments, the mast is collapsible for transport and repair, and extensible for installation and use; and the first interconnecting conduits have at least sections that are adapted to accommodate the collapsing and extending of the mast. Also, heat conducting liquids may be employed in the base to improve the heat transfer between the respective coils and the base.

BRIEF DESCRIPTION OF THE DRAWINGS

FIG. 1 is a side elevational view, partly schematic, showing one embodiment of this invention.

FIG. 2 is a side elevational view, partly in section and partly schematic, showing one embodiment of this invention.

FIG. 3 is a side elevational view of an embodiment of this invention in which the solar collectors can be tilted for maximizing the energy collected from the suns rays.

FIG. 4 is a cross sectional view from the top showing a base in accordance with another embodiment of this invention.

FIG. 5 is a cross sectional view from the side along the lines V—V of FIG. 4.

FIG. 6 is a cross sectional view of an embodiment of the base of this invention which air is circulated for withdrawal of the heat from the base.

FIG. 7 is a partial cross sectional view of one end of a solar collector showing a heat relief means.

FIG. 8 is a partial cross sectional view of elevation retention means for holding a mast in its extended position.

DESCRIPTION OF PREFERRED EMBODIMENTS

Referring to the drawings, and more particularly FIG. 1 thereof, the self contained solar heating supplemental unit 11, in accordance with one embodiment of this invention, is being employed to augment the source of heat for the home 13. The home 13 has the conventional air circulation system including a blower 15 and a heat exchanger 17 in which the air is flowed past a hot liquid for heating the home 13. The home 13 may have as its primary heating means, another source of hot liquid or a furnace or the like.

The self contained solar heating supplemental unit 11 includes a solar collector 19, a mast 21, and base 23 a first heating coil 25, FIG. 2, first interconnecting conduits 27, first circulating means 29, insulation 31 and at least one second heat withdrawal coil 33.

The solar collector 19 may be any of those commerically available on the market today. Ordinarily, the solar collector will have a transparent cover such as glass 35, FIG. 7, for allowing the sun light to be transmitted therethrough to an absorber plate 37 interiorly of the collector. The absorber plate is of a heat absorbing, heat conducting metal and connected with a plurality of sections of conduit 39 for circulating a fluid therethrough to take the heat from the absorber plate 37. Insulation 41 is provided to minimize heat loss from the absorber plate and the conduit 37, 39. The enclosure 40 approximates a "black box" as nearly as practical with an opaque material that resists transmission of heat and has adequate structural strength to maintain the solar collector against winds and the like.

The solar collector is carried by the mast 21 as nearly optimum as practical to maximize the heat energy received from the sun. For example, if desired, a tilting mechanism 43, FIG. 3, may be employed to allow placing the face of the collector 19 as nearly perpendicular to the rays from the sun as possible. As illustrated in FIG. 3, the tilting mechanism 43 comprises a lever 45 that is accessible to personnel from the ground and is connected to the solar collector 19 by tilting means 47. As illustrated the tilting means 47 comprises a rod that can be moved to tilt the solar collector (by either tension or compression) about a pivot axis 49 by which the mast 21 carries the mounting brackets 51 on the solar collector 19. Tilting means, or rod 47, is also pivotally connected with the solar collector 19 by way of pivot axis and bracket 53. A retention bar 55 is provided for retaining an attained angle at which the solar collector 19 is set on the mast 21.

The mast 21 is, in the preferred embodiment, collapsible for transport, repair and the like and extensible for installation and use. As illustrated, the mast 21 comprises respective telescoping sections 57, 59, 61. The respective telescoping sections may be elevated with respect to each other by any of the conventional means. As illustrated, they contain seals that sealingly slide within the adjacent contiguous section. The bottom section 61 has a valve 63 to which a pressurized fluid can be employed to raise the mast 21. For example a pneumatic source can be connected to the valve 63 to raise the mast 21 by air pressure. Once the respective sections are in position, a retention bell crank 65, FIG. 8 is employed to snap into place after passage of the bottom edge 67 and hold the respective sections 57 in the extended position until released. The respective bell cranks 65 have downwardly extending members 69 that are accessible, though stored in suitable trays 71 until needed to be used. Downward pulling on the members 69 will move the bell crank 65 outwardly to release the bottom edge 67 and allow the telescoping sections to be lowered. For example, air pressure may be again applied through the valve 63 to allow the bell crank 65 to be released; the bell cranks are thereafter pulled to release the bottoms 67 and the air pressure bled off to lower the mast 21.

Of course any of the other conventional ways of raising the mast may be employed; as by cable and winches, elevating a unitary mast into position with a crane or the like; or rack and pinion elevation or hydraulic ram elevation.

The mast 21 is preferably formed of a high strength structural material such as steel pipe or the like that has sufficient closeness and length of fit and rigidity to form a stable and nonoscillating mast when in position. The advantage of using a pressurized fluid is that the mast can be raised and lowered more easily.

The mast 21 may carry the solar collector 19 at any desired height from as low as about 10 feet to as high as 30 to 40 feet for an ordinary dwelling, or home, 13. Larger structures become infeasible to transport as self contained units.

When elevated into position, the solar collector 119 and mast 21 may have guy wires attached thereto for stabilizing them against high winds and the like. One of the advantages of this invention, however, is that the mast 21 is extraordinarily stable because of its manufactured attachment, as by anchor bolt 73 through flange 75, to the base 23.

The base 23, as indicated hereinbefore, serves a dual function of carrying the mast 21 and the solar collector 19 and having sufficient mass to serve as an anchor to keep the mast and collector upright and having sufficient mass and sensible heat capacity to serve as a thermal storage unit for storing heat energy. As illustrated, the base 23 is predominantly concrete that is poured into a form around the respective elements contained therewithin. The base 23 has lifting means such as eye bolts 77 for being lifted and transported to a situs for use. The base 23 is small enough to be moved to the situs for use. In terms of pragmatic considerations, this means that the maximum diameter of the base will be in the range of 8 to 12 feet in order to be moved down a highway economically. A cylindrical base having 6 to 8 foot in diameter is excellent for the purposes of this invention. Of course, the base may be square or have any other desired shape. It has been found advantageous in this invention, however, to employ coils that are generally circular in cross sectional arrangement in the base and hence employ circular forms for casting the concrete base 23.

As indicated hereinbefore, the base will have a mass of about 36,000–40,000 pounds of concrete so as to have a relatively high thermal storage capability. Yet, because it is fabricated and transported to the site, it does not invade the home or require appreciable interior space for storing the heat. Moreover, it does not require architectural modifications to the home to store the heat.

To store the heat, the first heating coil 25 is disposed in the base for circulating a first heat conducting fluid through the base for storing the heat that is removed from the solar collector. The first heating coil 25 may comprise any of the coils that transmit heat readily and that are durable for long term service. While aluminum and the like form good heat conductive coils, they are frequently attacked by or subject to deterioration in liquids that resist freezing; such as the diethylene glycol, triethylene glycol or water containing the same. Consequently, copper will frequently be employed in forming the first heating coil 25. The first heating coil 25 is wound in the desired configuration interiorly of the form and before the concrete is poured within the form and around the coil. The configuration may be of any shape desired, but circular is easily accomplished. The first heating coil 25 terminates in respective first and second ends 79, 81 that include connection means for connecting with the first interconnecting conduits and the first circulating means 27, 29.

The first interconnecting conduits 27 interconnect the solar collector conduit 39 with the first heating coil 25. In the event that the mast 21 is collapsible and extensible, the interconnecting conduits 27 preferably includes sections that are adaptable to accommodate the collapsing and extending of the mast. As illustrated in FIG. 2, the interconnecting conduits 27 have coils 83 that allow extension and collapsing without stretching the conduit and are flexible to accommodate the vertical reciprocal motion. For example, the interconnecting conduit may be formed of insulated hoses such as the Neoprene-coated fabric conduit with connectors at each end for connecting respectively with the ends of the first heating coil 25 and the solar collector conduit 39. On the other hand copper tubing, stainless steel tubing or the like may be employed, either throughout or in the nonextending sections. Preferably, the interconnecting conduit 27a will be connected as by connector 85 at the bottom of the solar collector 19; whereas the hot fluid interconnecting conduit 27b will be connected, as by connector 87 at the top of the solar collector. Preferably the interconnecting conduits are insulated, as by insulation 89, to reduce heat losses therefrom.

A first circulation means is interposed in series fluid connection with the first interconnecting conduits, the solar collector conduit and the first heating coil for periodically circulating the first heat transmission fluid for transferring heat from the solar collector to the base. Specifically, the fluid circulation means comprises a small pump in the illustrated embodiment. As illustrated, the pump is a centrifugal pump since the pressure differential will be relatively low and this is the most efficient form of pump for this application. Any other form of pump could be employed, however. As illustrated, the pump takes its suction from the cold side of the first heating coil and connects at its discharge with the cold interconnecting conduit 27a to circulate the fluid. It is relatively immaterial at what point the circulating means is connected into the system, although it usually consumes less power to circulate the cold fluid and the vanes of the impeller undergo less corrosion, erosion and the like with the cold fluid. Ordinarily, however, the temperatures in the solar collector do not reach above the boiling point of water and probably only about 170 degrees F. so that dangers of cavitation and other erosive and corrosive effects are minimized in this invention. In any event, the illustrated connection arrangement minimizes the danger of such types of cavitation and corrosive effects.

The first heating fluid that is employed may comprise, as indicated hereinbefore, aqueous solutions of the glycols because of their excellent heat transfer characteristics. If desired, on the other hand, the fluid that is to be circulated may comprise a refrigerant fluid. There are many refrigerant fluids typified by the Freons, such as Freon 11. Freon 11 is trichloromonofloromethane, $CCl_3F$. Any of the other Freons may be employed if desired. The object of the fluid in the first heating coil is to transfer the heat from the solar collector to the base where loss of the heat should be minimized by the insulation 31.

The insulation 31 may comprise any of the insulation conventionally employed; ranging from the precast blocks that are banded into place to the spray foams that are sprayed over the concrete base 23. Ordinarily about 9 to 12 inches of insulation will be adequate for the purposes of this invention. The typical spray foams include polystyrene foam, polyurethane foam and the like. Even the polyurethane may be employed in this invention, since the danger of fire is very remote so no toxic gases would be generated in an enclosure, as within a building or the like. It is preferred that all the respective elements be emplaced within, on and connected to the base before the insulation is emplaced. If desired, the insulation may extend above the base 23 to any desired distance on the mast 21. In the illustrated embodiment, insulation would ordinarily be employed on the bottom section 61 below the intermediate section 59 because of the telescoping mast 21. If desired, insulation may be employed interiorly of the bottom section 61 as well as to reduce heat losses in the cavity within the mast 21. If the interconnecting conduits 27 are properly insulated, only the pump 29 and the exposed top of the base 23 need be insulated within the cavity within the mast 21. It is the object of the insulation to prevent the heat loss from the base and conserve the heat for being withdrawn by the heat withdrawal coil 33.

As indicated hereinbefore, the second heat withdrawal coil 33 is disposed within the base and has connection means for connection with a second heat withdrawal circuit means for withdrawing heat from the base, as for heating the home 13. As discussed hereinbefore with respect to the first heating coil 25, the heat withdrawal coil is preferably formed of a heat conductive material that is resistant to the erosive and corrosive effects of a fluid being circulated therewithin. While aluminum coils have good heat transfer characteristics, they are not resistant to most aqueous liquids, such as the aqueous solutions of the glycols and copper coils are formed in the base 23 when a liquid is to be circulated therethrough. As illustrated, the heat withdrawal coil 33 has connectors 93 serving as the respective connection means for connecting with the second heat withdrawal circuit means 95, FIGS. 1 and 4.

The first heat withdrawal circuit means includes the heat exchanger 17 serially connected with the heat withdrawal conduits 97, 99, circulating pump 101 and the heat withdrawal coil 33. The heat withdrawal conduits 97 and 99 are preferably insulated, as by insulation 103. This retains in the heat withdrawal fluid as much of the heat as possible for use in heating the air being circulated within the home 13 in the illustrated embodiment.

The heat withdrawal fluid may be gas or liquid. If gas, it will probably be the air itself, as described in another embodiment later hereinafter. If liquid, it may be the same as the first heating fluid. Preferably the liquid will be a noncorrosive aqueous solution of triethylene glycol or other anti-freeze chemicals. The liquid is treated by organic additives such as organic zinc, the quaternary amines or the like to prevent corrosion. Such corrosion prevention treatment can be readily purchased for the particular system employed.

The pump 29 may be turned on periodically to circulate the fluid and transfer the heat from a solar collector 19 to the base 23 by any of the suitable conventional means. For example, it may be turned on periodically by means of a timer during the daylight hours. This type of control presupposes the continuous shining of the sun and is not the most efficient way to control the circulation of fluid to transfer the heat from the collector to the base. Preferably a temperature sensor 107 is employed in the solar collector and connected with a control 109 that is connected with the pump 29. The use of the terminology "connected with the pump 29" presupposes an integral motor and pump such as is conventionally employed in similar applications. It is to be realized, of course, that the electrical controls are wired to the motor portion of the pump and the motor rotates a shaft that drives the pump impeller or the like. Preferably the control 109 has a control knob 111 for varying the temperature at which the pump is to be turned on where only a single temperature sensor 107 is employed. More efficient control and more nearly fully automated control is available through the use of a second temperature sensor 113 disposed adjacent the first heating coil 25 and connected with the control 109. In this way, the pump 29 may be turned on when the temperature registered by the sensor 107 is greater than the temperature registered by the second sensor 113. Conversely, the pump 29 is stopped when the temperature sensed by the sensor 107 approaches, within a predetermined range, the temperature sensed by the second sensor 113.

In operation, the solar heat supplemental unit 11 is assembled and formed as described hereinbefore at the factory. Thereafter, it is lifted onto suitable transportation means, such as a truck and transported to the site at which it will be employed. The unit 11 is set outside the home and the respective connection means 93 on the second heat withdrawal coil are then connected with the respective heat withdrawal circuit means 95 and the unit is ready to operate.

Specifically, the sun will heat the absorber plate 37 and the conduit 39. When the temperature sensed by the temperature sensor 107 within the solar collector is sufficiently high, the pump 29 is turned on to circulate the fluid and transfer heat from the solar collector to the base 23. When the temperature falls to the appropriate level in the solar collector the pump is turned off to allow the heat to be absorbed and the temperature again to rise to the level at which the pump is turned on. Through this intermittent and periodic circulation of fluid, heat is transferred intermittently from the solar collector and stored in the base 23.

When heat is needed inside the home 13, the blower 15 is turned on to blow the air within the home past the heat exchanger 17 and the pump 101 is turned on to circulate fluid through the heat exchanger 17. The heat picks up the heat from the base 23 and employs the excess heat to heat the home 13. Of course, if desired, suitable thermostats may be employed to detect the temperature registered at the second temperature sensor 113 and not employ the pump 101 until that temperature is above the temperature within the home 13. As indicated hereinbefore, a conventional source of heat such as a hot water unit, gas fired furnace, or the like will be employed to heat the air in the home 13 until sufficient heat is stored in the base 23 to raise the temperature to an appropriate level to transfer heat into the home 13. Thereafter, heat is taken from the base 23 as a supplement to the conventional source and lower the total overall heating cost for heating the home 13.

As indicated, the solar collector 19 may be tilted through the appropriate tilting mechanism 43 to maximize the area exposed to solar radiation.

OTHER EMBODIMENTS

If desired, the heat transfer from and to the respective first and second coils 25 and 33 may be improved by the use of a liquid immediately about and in contact with the coils. This liquid may take form of an aqueous solution of diethylene glycol or triethylene glycol, commonly referred to simply as glycol, in a cavity, as illustrated in FIGS. 4 and 5. Therein, the first heating coil 25 is disposed within a cavity 115 that is filled with glycol 117. The cavity 115 may be extended completely to the top of the base 23 if desired; or it may be only partially filled with the glycol to leave an air space at the top for expansion and alleviate problems with spillage or the like. It is preferred that an access semi-circular ring 119 be employed to allow access to the glycol for replenishing it. Preferably, the second heat withdrawal coil 33 is also disposed in the liquid transfer medium, or glycol 117. In this way, exceptionally good heat transfer is experienced between the first heating coil 25 and the second heat withdrawal coil 33 while excess heat is slowly stored in the base 23 within the insulation 31. If desired, suitable liquid pockets 121 may be employed and connected into the annular cavity 115 to increase the heat transfer throughout the base 23.

If desired, the air or other gaseous fluid that is to be heated may be circulated directly through the base 23, as illustrated in FIG. 6. Therein, the base 23 is illustrated as being concrete poured about emplaced ducts 123. The ducts 123 are connected, as by welding, to a face plate 125 that is emplaced before the concrete is poured, as described hereinbefore, the first heating coil 25 will have been emplaced before the concrete is poured also. Suitable plenums 127 and 129 may be connected to the base plate 125 by suitable means, such as bolts and nuts 131 or the like. Preferably, insulation 133 is employed about the plenums 127 and 129 such that heat loss is minimized from the air that is heated by being circulated through the base 23.

The operation of the embodiments of FIGS. 4 and 5 is the same as described hereinbefore. Only the heat transfer is improved.

The operation of the embodiment of FIG. 6 is substantially the same as described hereinbefore except that the air is circulated directly through the ducts 123 in the base 23 to pick up the heat therefrom, instead of being circulated past the heat exchanger 17 as illustrated in FIG. 1.

If it is desired to maintain a predetermined maximum temperature; for example 250° F.; in the solar collector 19, a heat release means may be employed. Such a heat release means is illustrated in FIG. 7. Therein, a heat sensitive coil 135 is connected to the cabinet 40 of the solar collector 19 and is connected with a double poppet 137. Thus, when a predetermined temperature is reached, expansion of the coil will move the double poppet 137 upwardly to open the respective bottom and top apertures 139, 141 and allow air to flow through the solar collector to bring it down to the desired temperature range.

If desired, a small blower or the like may be employed in the solar collector. This is ordinarily not necessary.

The mast carrying the solar collector may be a relatively elaborate mast, such as illustrated in FIGS. 1-3; a simple single-piece mast, as indicated hereinbefore, or a multiple piece mast, such as a hingedly mounted top. The latter type mast offers an economical version. In the latter type mast a stub mast about 3–5 feet in length is integrally connected to the base 23 while a top section is hingedly and pivotally mounted to the top of the stub mast. The top section carrying the solar collector is then raised into its vertical operative position by suitable means, as by winch, crane or the like. The top section is then rigidly connected to the stub mast, as by a second bolt spaced from the hinge bolt, or axis, and penetrating thru both a covering tubular portion of the bottom of the top section and the stub mast connected to the base.

The base may contain a plurality of heat withdrawal coils that are connected with heat using means. For example, a water heater may be connected to one heat withdrawal coil for supplying hot water. Other good examples are the connections of the solar heating supplemental unit are in the heating of greenhouses, garages, warehouses and the like.

A single solar heating supplemental unit may be supplied with one or a plurality of heat withdrawal coils that are connected with respective blowers and heat exchangers for heating the enclosures listed, singly or a plurality of same or different kinds. If desired the blowers and heat exchangers may be supplied interconnected with quick disconnect means that include check valves at each end that is freed by disconnection. The check valve type quick disconnect thus allow scale and installation of an integral unit containing the complete one or more heat withdrawal circuits for withdrawing heat from the base.

From the foregoing, it can be seen that this invention accomplishes the objects delineated hereinbefore. Because the solar heating supplemental unit can be mass produced at a factory, its cost is low, making it feasible for many installations. More specifically, this invention allows employing a solar heat supplemental unit that can be taken to a situs and emplaced for use in supplementing the conventional heating source and reducing costs. This supplementing can be done with no substantial architectural modifications to the structure and without requiring significant internal space for storing of the thermal energy.

Although the invention has been described with a certain degree of particularity, it is understood that the present disclosure is made only by way of example and that numerous changes in the details of construction and the combination and arrangement of parts may be resorted to without departing from the spirit and the scope of the invention, a reference for the latter being had to the appended claims.

What is claimed is:

1. A self contained solar heating supplemental unit comprising:
   a. at least one solar collector having at least one conduit through which a first heat conducting fluid can be circulated to carry away heat energy;
   b. a mast carrying said solar collector above the surface of the earth;
   c. a dual function base carrying said mast and said solar collector; said base having sufficient mass to serve as an anchor to keep said mast and collector upright and having sufficient mass and heat capacity to serve as a thermal storage unit for storing heat energy; said base having lifting means for being lifted and transported to a site for use; said base being small enough to be moved to said site;
   d. a first heating coil containing said first heat conducting fluid and disposed in said base for circulating said first heat conducting fluid through said base for storing heat from said collector in said base;
   e. first interconnecting conduits sealingly interconnecting said collector conduits with said first heating coil;
   f. first circulating means interposed in series fluid connection with said first interconnection conduits, solar collector conduit and first heating coil for periodically circulating said first heating fluid for transferring heat from said solar collector to said base;
   g. said first heat conducting fluid being disposed also in said first interconnecting conduits and said first circulating means;
   h. insulation surrounding said base to minimize heat leakage therefrom; and
   i. at least one second heat withdrawal coil disposed in said base and having connection means for connection with a second heat withdrawal circuit means and circulating a heat withdrawal fluid for withdrawing heat from said base.

2. The unit of claim 1 wherein said mast is collapsible for transport, repairs and the like and is extensible for installation and use; and said first interconnecting conduits include at least sections that are adapted to accommodate the collapsing and extending of said mast.

3. The unit of claim 1 wherein a liquid heat transfer medium is disposed in said base and said first heating coil is disposed in contact with said liquid heat transfer medium for improved heat transfer.

4. The unit of claim 3 wherein said second heat withdrawal coil is disposed in contact with said liquid heat transfer medium for improved heat transfer.

5. The unit of claim 1 wherein a first temperature sensor is located in said solar collector, a control is connected with said first circulating means and said first temperature sensor, and means is provided for adjusting said control to automatically determine when said first circulating unit is turned and off.

6. The unit of claim 5 wherein a second temperature sensor is disposed in said base and said control is connected therewith; and said control turns on said first circulating means when said first temperature sensor senses a higher temperature than said second temperature sensor.

7. The unit of claim 1 wherein said second heat withdrawal coil is adapted for airflow and said connection means are adapted for connecting with air circulating plenums.

8. The unit of claim 1 wherein said second heat withdrawal coil is adapted for liquid flow and said connection means are adapted for connection with conduit for circulating a liquid.

9. The unit of claim 1 wherein a high temperature relief sensor and a heat release means are provided in said solar collector; said high temperature release sensor is connected with said heat release means so as to effect release of heat from said solar collector when the temperature exceeds a predetermined maximum temperature $t_{max}$.

10. The unit of claim 1 wherein said second heat withdrawal coil is connected serially with interconnecting conduits, a heat exchanger, and a pump into a heat withdrawal circuit; a heat withdrawal fluid is disposed within said heat withdrawal circuit; and means is provided for circulating another fluid past said heat exchanger in heat exchange relationship with said heat withdrawal fluid withdrawing heat from said base.

* * * * *